(12) United States Patent
Takimoto

(10) Patent No.: US 11,182,040 B2
(45) Date of Patent: Nov. 23, 2021

(54) INFORMATION PROCESSING DEVICE, INFORMATION PROCESSING METHOD, AND PROGRAM FOR CONTROLLING BEHAVIOR OF AN APPLICATION BASED ON ASSOCIATION INFORMATION

(71) Applicant: SONY CORPORATION, Tokyo (JP)

(72) Inventor: Yuuji Takimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 417 days.

(21) Appl. No.: 15/328,152

(22) PCT Filed: Aug. 25, 2015

(86) PCT No.: PCT/JP2015/073908
§ 371 (c)(1),
(2) Date: Jan. 23, 2017

(87) PCT Pub. No.: WO2016/035620
PCT Pub. Date: Mar. 10, 2016

(65) Prior Publication Data
US 2017/0220205 A1 Aug. 3, 2017

(30) Foreign Application Priority Data
Sep. 2, 2014 (JP) .............................. JP2014-178564

(51) Int. Cl.
*G06F 3/0481* (2013.01)
*G06F 3/0346* (2013.01)
(Continued)

(52) U.S. Cl.
CPC ............ *G06F 3/0481* (2013.01); *G06F 3/017* (2013.01); *G06F 3/048* (2013.01);
(Continued)

(58) Field of Classification Search
CPC ...... G09G 5/14; G09G 2354/00; G06F 3/048; G06F 3/017; G06F 9/451; G06F 3/0481; G06F 3/04812; G06F 2203/04803
See application file for complete search history.

(56) References Cited

U.S. PATENT DOCUMENTS 7,739,604 B1 * 6/2010 Lyons ................... G06F 3/0486
709/213
2004/0221010 A1 * 11/2004 Butler ..................... G06F 3/038
709/204
(Continued)

FOREIGN PATENT DOCUMENTS

JP        08-314677      11/1996
JP        10-069366      3/1998
(Continued)

OTHER PUBLICATIONS

NextHub Team. Conferencing Policy Settings: AllowParticipantControl [online]. Microsoft TechNet, Aug. 11, 2011 [retrieved on Oct. 16, 2018]. Retrieved from the Internet <URL:https://blogs.technet.microsoft.com/nexthop/2011/08/11/conferencing-policy-settings-allowparticipantcontrol/>.*
(Continued)

*Primary Examiner* — Jennifer N Welch
*Assistant Examiner* — K C Chen
(74) *Attorney, Agent, or Firm* — Paratus Law Group, PLLC

(57) ABSTRACT

There is provided an information processing device including: an acquisition unit configured to acquire association information indicating association of an application region and a user, the application region corresponding to an activated application and being a region displayed in a display region; and a behavior control unit configured to control, when a user operation in the display region is detected, a behavior of the application that corresponds to
(Continued)

the application region based on the association information with regard to the application region and information indicating a user whose operation has been detected.

20 Claims, 3 Drawing Sheets

(51) Int. Cl.
*G06F 3/0338* (2013.01)
*G06F 3/01* (2006.01)
*G06T 7/50* (2017.01)
*G06F 3/048* (2013.01)
*G06F 9/451* (2018.01)
*G09G 5/14* (2006.01)

(52) U.S. Cl.
CPC .......... *G06F 3/04812* (2013.01); *G06F 9/451* (2018.02); *G09G 5/14* (2013.01); *G06F 2203/04803* (2013.01); *G09G 2354/00* (2013.01)

(56) References Cited

U.S. PATENT DOCUMENTS

| | | | | |
|---|---|---|---|---|
| 2006/0048067 | A1* | 3/2006 | DeSpain | G06F 3/0481 715/768 |
| 2008/0109753 | A1* | 5/2008 | Karstens | G06F 9/542 715/802 |
| 2011/0197263 | A1* | 8/2011 | Stinson, III | G06F 3/011 726/4 |
| 2012/0268372 | A1* | 10/2012 | Park | G06F 3/017 345/158 |
| 2013/0055162 | A1* | 2/2013 | Arriola | G06F 16/44 715/811 |
| 2013/0179838 | A1* | 7/2013 | LeVee | G06F 9/485 715/825 |
| 2013/0290868 | A1* | 10/2013 | Nancke-Krogh | G06F 9/452 715/750 |
| 2014/0325431 | A1* | 10/2014 | Vranjes | G06F 3/0481 715/788 |

FOREIGN PATENT DOCUMENTS

| | | |
|---|---|---|
| JP | 2003-018155 | 1/2003 |
| JP | 2003-150971 | 5/2003 |
| JP | 2010-026327 | 2/2010 |
| JP | 2013-033395 | 2/2013 |
| JP | 2013-125551 | 6/2013 |
| JP | 2013-161179 | 8/2013 |
| JP | 2013-205983 | 10/2013 |
| WO | WO2010/027086 A1 | 3/2010 |

OTHER PUBLICATIONS

De Capitani di Vimercati, Sabrina et al. Access control: principles and solutions. Software-Practice and Experience, 2002; vol. 00, No. 1-7, pp. 2 [online], [retrieved on Oct. 16, 2018]. Retrieved from the internet <URL:http://wpage.unina.it/pieroandrea.bonatti/didattica/security/access-control-principles.pdf>.*

Napier, Robert, Secure Automation: Achieving Least Privilege with SSH, Sudo, and Setuid. LISA XVIII, 2004; Nov. 14-19, 2004 [retrieved on Oct. 16, 2018]. Retrieved from the Internet <URL:https://www.usenix.org/events/lisa04/tech/full_papers/napier/napier.pdf>.*

* cited by examiner

INFORMATION PROCESSING DEVICE, INFORMATION PROCESSING METHOD, AND PROGRAM FOR CONTROLLING BEHAVIOR OF AN APPLICATION BASED ON ASSOCIATION INFORMATION

CROSS REFERENCE TO PRIOR APPLICATION

This application is a National Stage Patent Application of PCT International Patent Application No. PCT/JP2015/073908 (filed on Aug. 25, 2015) under 35 U.S.C. §371, which claims priority to Japanese Patent Application No. 2014-178564 (filed on Sep. 2, 2014), which are all hereby incorporated by reference in their entirety.

TECHNICAL FIELD

The present disclosure relates to an information processing device, an information processing method, and a program.

BACKGROUND ART

Technologies for users to operate apparatuses with their gestures have been developed. As a technology for operating an apparatus with gestures using hands, for example, the technology disclosed in Patent Literature 1 mentioned below is exemplified. In addition, technologies for causing windows each corresponding to a plurality of users to be displayed in regions on a display screen in which display can be performed (each of which will be referred to hereinafter as a "display region") have been developed. As a technology in which display ranges of windows each corresponding to a plurality of users in a display device are decided and windows which correspond to users who are closer to the display device are displayed first with priority, for example, the technology disclosed in Patent Literature 2 mentioned below is exemplified.

CITATION LIST

Patent Literature

Patent Literature 1: JP 2013-205983A
Patent Literature 2: JP 2010-026327A

DISCLOSURE OF INVENTION

Technical Problem

Among cases in which user operations are performed in display regions, not only a case in which only one user can utilize a display region but also a so-called multi-user case in which a plurality of users can simultaneously utilize a display region is assumed.

The present disclosure proposes a novel and improved information processing device, information processing method, and program which enable improvement in user convenience when a plurality of users can simultaneously utilize a display region.

Solution to Problem

According to the present disclosure, there is provided an information processing device including: an acquisition unit configured to acquire association information indicating association of an application region and a user, the application region corresponding to an activated application and being a region displayed in a display region; and a behavior control unit configured to control, when a user operation in the display region is detected, a behavior of the application that corresponds to the application region based on the association information with regard to the application region and information indicating a user whose operation has been detected.

According to the present disclosure, there is provided an information processing method executed by an information processing device, the method including: a step of acquiring association information indicating association of an application region and a user, the application region corresponding to an activated application and being a region displayed in a display region; and a step of controlling, when a user operation in the display region is detected, a behavior of the application that corresponds to the application region based on the association information with regard to the application region and information indicating a user whose operation has been detected.

According to the present disclosure, there is provided a program for causing a computer to execute: a step of acquiring association information indicating association of an application region and a user, the application region corresponding to an activated application and being a region displayed in a display region; and a step of controlling, when a user operation in the display region is detected, a behavior of the application that corresponds to the application region based on the association information with regard to the application region and information indicating a user whose operation has been detected.

Advantageous Effects of Invention

According to the present disclosure, improvement in user convenience when a plurality of users can simultaneously utilize a display region can be achieved.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
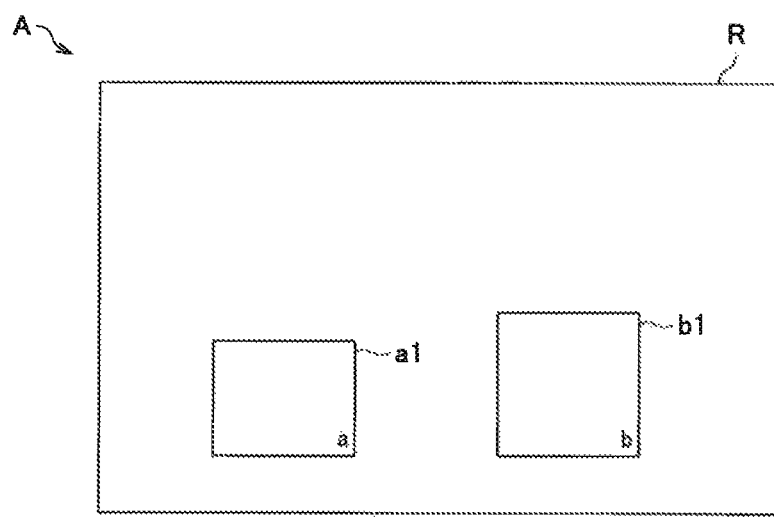
FIG. 1 is an illustrative diagram for describing an example of a process of an information processing method according to the present embodiment.
Figure 1:
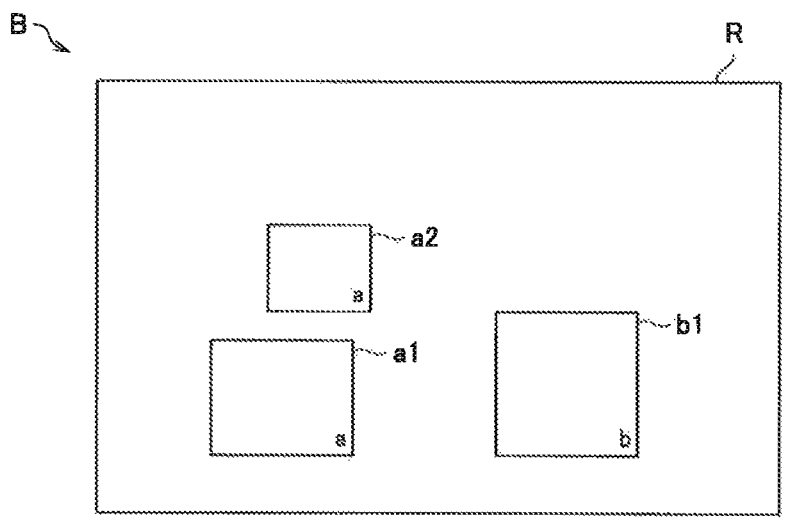

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, description will be provided in the following order.

1. Information processing method according to present embodiment
2. Information processing device according to present embodiment
3. Program according to present embodiment (Information Processing Method According to Present Embodiment)

Before a configuration of an information processing device according to the present embodiment is described, an information processing method according to the present embodiment will be described first. The information processing method according to the present embodiment will be described below, exemplifying a case in which the information processing device according to the present embodiment performs the information processing method according to the present embodiment.

[1] Overview of Information Processing Method According to Present Embodiment

Among cases in which users perform operations in a display region, a so-called multi-user case is assumed as described above.

Here, as the display region according to the present embodiment, for example, a display region of a display screen of a display unit (which will be described below) included in the information processing device according to the present embodiment, or a display region of a display screen of a display device outside the information processing device according to the present embodiment is exemplified. With regard to a display region according to the present embodiment, for example, one display is arranged in the entire display region. In addition, with regard to the display region according to the present embodiment, only a part of a large display may be displayed in the display region as on, for example, the home screen of a smartphone. When only a part of a large display is to be displayed in a display region, a user can cause it to be displayed by performing, for example, scrolling through a predetermined operation (for example, an operation using a gesture, etc.).

When the multi-user case is considered, the multi-user case is assumed to include a state in which one user performs an operation in a display region (hereinafter referred to as a "single operation state") and a state in which a plurality of users perform operations in a display region (hereinafter referred to as a "plural operation state"). Here, each of the plurality of users can perform operations in the display region in the plural operation state; however, if the respective users can perform operations in their own respective operation environments, the operations are convenient for them, and thus user convenience can be improved.

Thus, the information processing device according to the present embodiment acquires association information which indicates an association between application regions and users (an acquisition process).

Here, a process of controlling the association of application regions and users (hereinafter referred to as an "association control process") may be performed by the information processing device according to the present embodiment, or an external apparatus of the information processing device according to the present embodiment. When the information processing device according to the present embodiment performs the association control process, the information processing device according to the present embodiment acquires association information generated from the association control process in the acquisition process. In addition, when the external apparatus performs the association control process, the information processing device according to the present embodiment acquires association information generated by the external apparatus in an acquisition process. Here, generation of association information according to the present embodiment includes, for example, new generation of association information (including addition of a record into a table, or the like) and updating of association information.

In addition, when an operation of a user in a display region is detected, the information processing device according to the present embodiment controls a behavior of an application that corresponds to an application region based on association information with regard to the application region and information indicating the user whose operation has been detected (a behavior control process). As described above, by controlling the behavior of the application based on the association information and the information indicating the user whose operation has been detected as described above, the information processing device according to the present embodiment realizes control of the behavior of the application that corresponds to the application region according to the user whose operation has been detected.

Here, an application region according to the present embodiment is, for example, a region that is allocated to and located in a display region, corresponding to an activated application. The application region according to the present embodiment is displayed in the display region when, for example, the application is activated. The application region according to the present embodiment can be a target of a direct operation of the user in the application region, or an indirect operation of the user in the application region in the display region.

A direct operation of a user in an application region according to the present embodiment refers to, for example, an operation of a user in a display region that is detected as an operation in the specific application region. Direct operations of a user in an application region according to the present embodiment include operations set as direct operations, for example, an "operation of pointing at a specific application (an example of an operation using a hand)," an "operation of directing one's line of sight toward a specific application region (an example of an operation using a line of sight)," an "operation of directing an operation device such as a remote controller toward a specific application region," an "operation of putting a cursor or the like on a specific application region using an operation device such as a remote controller," and the like. Such a direct operation of a user in an application region according to the present embodiment may be referred to simply as a "direct operation" hereinbelow.

In addition, an indirect operation of a user in an application region according to the present embodiment refers to, for example, an operation of a user in a display region that is not detected as an operation in the specific application region. Indirect operations of a user in an application region according to the present embodiment include operations set as indirect operations, for example, a "flicking operation of heavily swinging a hand or an operation device such as a remote controller," an "operation performed across a plurality of application regions," and the like. An indirect operation of a user in an application region according to the present embodiment may be referred to simply as an "indirect operation" hereinbelow.

When a user operation is an operation using a gesture or an operation using a line of sight, the user operation, a position of a display region indicated by the user operation according to the present embodiment, or the like is detected using, for example, any gesture detection technology such as the technology disclosed in Patent Literature 1, the application for which was filed by the applicant of the present technology, any line-of-sight detection technology like a technology for detecting a line of sight using a captured image, or the like. When an operation using a gesture is a finger-pointing motion of a user, for example, the intersection of a display region and an extension line of a finger of the user, such as an index finger, is regarded as a position of the display region indicated by the operation of the user.

In addition, when a user operation is an operation using an operation device such as a remote controller, the user operation, a position of a display region indicated by the user operation according to the present embodiment, or the like is detected through, for example, an operation signal according to the user operation acquired from the operation device.

A process of detecting a user operation may be performed by, for example, the information processing device according to the present embodiment, or an external apparatus of the information processing device according to the present embodiment. When the information processing device according to the present embodiment performs the process of detecting a user operation, the information processing device according to the present embodiment performs processes based on the user operation detected by the device itself (the information processing device according to the present embodiment; the same applies hereinbelow), or a position of a display region indicated by the user operation. In addition, when the external apparatus performs the process of detecting a user operation, the information processing device according to the present embodiment performs processes based on information indicating the detection result of the user operation acquired from the external apparatus through communication (data indicating a type or a degree of a detected operation, or the like), or information indicating a position of a display region indicated by the user operation (for example, coordinate data expressing the set position of the display region as the origin).

As an application region according to the present embodiment, for example, a Window (for example, a rectangular region) allocated to a display region in a so-called window system is exemplified. Note that the application region according to the present embodiment is not limited to a window. The application region according to the present embodiment may be any display object displayed in a display region when accessory software (an example of an application), for example, a gadget (or a widget), or the like is activated. A case in which the application region according to the present embodiment is a window will be exemplified.

As an application according to the present embodiment, any application software, for example, a browser, an application related to reproducing content on which content such as images (dynamic images or still images) and/or sounds (including music) is reproduced, application software such as a gadget, a business application used for a business, or the like is exemplified.

As an association control process according to the present embodiment, for example, an association process in which an application region is associated with a user, or a cancelling process in which association of an application region and a user is cancelled is exemplified. Examples of the association control process according to the present embodiment including examples of the association process according to the present embodiment and examples of the cancellation process according to the present embodiment will be described below.

As association information according to the present embodiment, for example, a table (or a database) in which information indicating an application region and information indicating a user are associated is exemplified. Note that the association information according to the present embodiment is not limited to a table, and data in any format which can indicate association of an application region and a user is possible. A case in which the association information according to the present embodiment is a table (or a database) in which information indicating an application region and information indicating a user are associated will be exemplified below.

Note that "information indicating that an application will not work according to an operation of a user who is associated with an application region" may be further associated in the association information according to the present embodiment. As the "information indicating that an application will not work according to an operation of a user who is associated with an application region," for example, a flag is exemplified. When the flag associated with a certain application region is set to be on, for example, the application will not work according to an operation of a user even if the user who is associated with the application region has performed the operation. That is, the association information in which the "information indicating that an application will not work according to an operation of a user who is associated with an application region" is associated plays the role of a so-called blacklist.

A case in which the "information indicating that an application will not work according to an operation of a user who is associated with an application region" is a flag will be exemplified below.

The association information according to the present embodiment may be stored in, for example, a storage unit (to be described below) provided in the information processing device according to the present embodiment, an external recording medium connected to the information processing device according to the present embodiment, or an external apparatus which can communicate with the information processing device according to the present embodiment. In the acquisition process according to the present embodiment, the information processing device according to the present embodiment reads the association information from a recording medium such as the storage unit (to be described below), or acquires the association information by receiving the association information through communication with an external apparatus.

As information indicating the application region according to the present embodiment, one or more pieces of data which can specify the application region, for example, an ID indicating the application region, a range of a display region occupied by the application region (which may be referred to hereinafter as a "display range"), and the like are exemplified.

A display range according to the present embodiment is expressed with, for example, a display position of an application region. When an application region is a rectangular region, for example, the display range according to the present embodiment is expressed with positions of the four corners of the application region, and when the application region is a region in any shape, the application region is expressed with positions of the four corners of a rectangular region which includes the application region. Note that a display range according to the present embodiment is not limited to the above-described example, and may be expressed with one or more indices which can indicate a range of a display region occupied by an application region.

In addition, as user indication information according to the present embodiment, any data which can specify a user, for example, information directly indicating the user, such as an ID indicating the user, or information indirectly indicating the user performing operations, such as an ID of an operation device, is exemplified. In addition, the user indication information according to the present embodiment may include, for example, information that can be used to specify the user (for example, data that can be used in face authentication, such as data related to feature points of a face, data that can be used in recognition of an iris such as iris data, etc.). Hereinbelow, the user indication information according to the present embodiment may be referred to as "user information."

As control over behaviors of an application according to a user whose operation according to the present embodiment has been detected, control over behaviors of an application based on presence of an application region associated with a user whose operation has been detected is exemplified, for example, as follows.

in the presence of an application region associated with a user whose operation has been detected, behaviors of an application which corresponds to the application region associated with the user are controlled based on the detected operation of the user in a display region.

In the absence of an application region associated with a user whose operation has been detected, behaviors of an application which corresponds to an application region are not controlled based on the detected operation of the user in a display region.

Here, as an operation of a user in a display region, a direct operation and an indirect operation are exemplified as described above. The information processing device according to the present embodiment may determine whether the detected operation of the user in the display region is a direct operation or an indirect operation. Determining whether the detected operation of the user in the display region is a direct operation or an indirect operation is equivalent to determining whether the detected operation of the user in the display region is an operation in a specific application region displayed in the display region.

The "process of determining whether the operation of the user is a direct operation or an indirect operation," i.e., the "process of determining whether the detected operation of the user in the display region is an operation in a specific application region displayed in the display region," (which may be referred to hereinafter as a "determination process according to a user operation") can be performed by the information processing device according to the present embodiment as described above, however, the determination process according to a user operation may be performed by an external apparatus of the information processing device according to the present embodiment.

When the information processing device according to the present embodiment performs the determination process according to a user operation to determine whether the detected user operation in the display region is an operation in a specific application region displayed in the display region, the information processing device according to the present embodiment controls behaviors of an application according to the determination result as shown in, for example, (A) and (B) below. In addition, when an external apparatus performs the determination process according to a user operation, the information processing device according to the present embodiment controls behaviors of an application according to the determination result of the determination process by the external apparatus according to a user operation as shown in, for example, (A) and (B) below. Note that it is a matter of course that an example of control over behaviors of an application according to the determination result is not limited to the examples shown in (A) and (B) below.

(A) When the detected user operation in the display region is determined to be an operation in the specific application region displayed in the display region (when the detected user operation in the display region is a direct operation):

the information processing device according to the present embodiment controls behaviors of an application that corresponds to the specific application region corresponding to the direct operation.

(B) When the detected user operation in the display region is determined not to be an operation in the specific application region displayed in the display region (when the detected user operation in the display region is an indirect operation):

the information processing device according to the present embodiment controls behaviors of an application that corresponds to an application region on which, for example, the user whose operation has been detected performed an operation most recently.

Here, the information processing device according to the present embodiment manages, for example, an application for which a user performed an operation most recently for each user using a table in which information indicating application regions and user information are associated. In addition, the information processing device according to the present embodiment specifies an application region for which a user whose operation has been detected performed an operation most recently with reference to a table in which information indicating application regions and user information are associated. Then, the information processing device according to the present embodiment controls behaviors of an application that corresponds to the specified application region. Note that the application region for which the user performed an operation most recently may be managed through a table (or a database) in which user information and information indicating the application region for which the operation was performed most recently are associated, or the like.

In addition, the information processing device according to the present embodiment may control behaviors of applications that correspond to, for example, all application regions associated with the user whose operation has been detected. With reference to such a table in which information indicating application regions and user information are associated, the information processing device according to the present embodiment, for example, specifies all application regions associated with the user whose operation has been detected, and controls behaviors of the applications that correspond to all of the specified application regions.

As behaviors of an application controlled using the information processing method according to the present embodiment, for example, the examples shown in a first control example introduced in (a) to a fourth control example introduced in (d) below are exemplified. Note that it is a matter of course that control examples with regard to behaviors of an application according to the present embodiment are not limited to the examples of the first control example introduced in (a) to the fourth control example introduced in (d) below.

(a) First Control Example of Behaviors of Application

The information processing device according to the present embodiment causes an application that corresponds to an application region associated with a user whose operation has been detected to work according to a type or an amount of the detected operation.

Here, the information processing device according to the present embodiment can control behaviors of the application according to a determination result of the determination process according to a user operation performed by the device itself and/or an external apparatus as described above.

For example, when an operation is determined to be an operation in a specific application region in the determination process according to a user operation, in other words, when a direct operation of a user in an application region is detected, the information processing device according to the present embodiment causes the application that corresponds to the specific application region corresponding to the direct operation to work based on the detected operation (an example of the behavior of an application corresponding to (A) described above).

In addition, for example, when an operation is determined not to be an operation in a specific application region in the determination process according to a user operation, in other words, when an indirect operation of a user in an application region is detected, the information processing device according to the present embodiment causes an application that corresponds to an application region for which the user whose operation has been detected performed an operation most recently to work based on the detected operation (an example of the behavior of an application corresponding to (B) described above). The information processing device according to the present embodiment may move a cursor corresponding to the user whose operation has been detected to a position of the application region for which the user performed the operation most recently, and cause the application that corresponds to the application region to work based on the detected operation.

In addition, when an indirect operation of a user in an application region is detected, for example, the information processing device according to the present embodiment can erase all application regions displayed in a display region and associated with the user whose operation has been detected from the display region (an example of the behavior of an application corresponding to (B) above). The information processing device according to the present embodiment, for example, may terminate the applications that correspond to all the application regions associated with the user whose operation has been detected and erase the application regions from the display region, or may erase the application regions from the display region without terminating the applications. Erasing the application regions from the display region may be expressed hereinbelow as "closing the application regions."

In addition, when an indirect operation of the user in application regions is detected, for example, the information processing device according to the present embodiment can also minimize all application regions associated with the user whose operation has been detected and cause them to be displayed in a display region (an example of the behavior of an application corresponding to (B) described above).

In addition, when an indirect operation of the user in application regions is detected, for example, the information processing device according to the present embodiment may cause all application regions associated with the user whose operation has been detected including, for example, application regions minimized and displayed in the display region, application regions not displayed in the display region, and the like to be displayed in the display region (an example of the behavior of an application corresponding to (B) described above).

As described above, for example, the information processing device according to the present embodiment causes an application that corresponds to an application region associated with a user whose operation, for example, an operation using a gesture, has been detected to work according to a type or an amount of the detected operation.

On the other hand, the information processing device according to the present embodiment causes an application that corresponds to an application region that is not associated with the user whose operation has been detected not to work according to a type or an amount of the detected operation. That is, an application region that is not associated with the user whose operation has been detected is excluded from targets to be operated by the user whose operation has been detected.

As described above, by causing an application that corresponds to an application region that is not associated with the user whose operation has been detected not to work according to an operation, for example, even when the user points at a non-associated application region with his or her finger-pointing motion, the application that corresponds to the pointed application region does not work. Thus, the information processing device according to the present embodiment can prevent erroneous user operations from occurring.

In addition, in the presence of an application region that is excluded from targets to be operated by the user whose operation has been detected as described above, for example, it is realized that a "display of the application region excluded from targets to be operated in a display region does not change when application regions associated with the user whose operation has been detected are closed."

Note that a first control example of behaviors of an application is not limited to the above-described example.

As described above, a flag (an example of information indicating that an application will not work according to an operation of a user associated with an application region) can be associated with association information according to the present embodiment. When the flag is associated with the association information according to the present embodiment, for example, the information processing device according to the present embodiment does not cause an application that corresponds to an application region whose flag is set to be in an on-state among the application regions associated with the user whose operation has been detected not to work according to a type or an amount of the detected operation. In other words, an application region whose flag is set to be in an on-state, even an application region associated with the user whose operation has been detected, is excluded from targets to be operated by the user whose operation has been detected.

(b) Second Control Example of Behaviors of Application

The information processing device according to the present embodiment changes the method of displaying an application region associated with a user whose operation has been detected according to the user.

The information processing device according to the present embodiment changes the method of displaying an application region by changing, for example, the size of the display of the application region, or the size of a graphical user interface (GUI) included in the application region according to a user whose operation has been detected. The information processing device according to the present embodiment changes the method of displaying the application region according to the user whose operation has been detected with reference to, for example, a table (or a database) in which user information is associated with information (data) indicating the size of the display of the application region, the size of the GUI, and the like. The data included in the table or the like is stored in, for example, the storage unit (to be described below) provided in the information processing device according to the present embodiment, an external recording medium connected to the information processing device according to the present embodiment, or the like.

Note that a process of changing the method of displaying an application region according to a user whose operation has been detected according to the present embodiment is not limited to the above example.

For example, the information processing device according to the present embodiment may adjust the size of the display of the application region or the size of the GUI included in the application region based on information indicating the distance from the display region to the user whose operation has been detected. The adjustment of the size of the display of the application region or the like is performed with respect to a reference value that is not related to the user, or a reference value related to each user. Here, the distance from the display region to the user whose operation has been detected is estimated (or measured) using any method in which the distance can be measured, such as the triangulation method or time-of-flight (TOF) method. The process of estimating the distance from the display region to the user whose operation has been detected is performed by, for example, the information processing device according to the present embodiment, or an external apparatus of the information processing device according to the present embodiment (or an external device such as a distance sensor).

(c) Third Control Example of Behaviors of Application

The information processing device according to the present embodiment changes details of a display of an application region associated with a user whose operation has been detected.

The information processing device according to the present embodiment changes the details of the display of the application region by, for example, setting a parameter of an application or the like according to the user whose operation has been detected. In the case in which the application that corresponds to the application region is a browser and the application region is a window of the browser, the information processing device according to the present embodiment sets, for example, a list of web links (so-called bookmarks) for the user whose operation has been detected on the browser. Note that it is a matter of course that an example of a process of changing the details displayed in the application region is not limited to the above.

(d) Fourth Control Example of Behaviors of Application

The information processing device according to the present embodiment may control behaviors of an application by appropriately combining two or more of the first control example introduced in (a) to the third control example disclosed in (c) above.

As described above, the information processing device according to the present embodiment acquires association information (an acquisition process) as a process of the information processing method according to the present embodiment. In addition, when an operation of a user in a display region is detected, the information processing device according to the present embodiment controls behaviors of the application that corresponds to the application region based on the association information with regard to the application region and information indicating the user whose operation has been detected (a behavior control process). Furthermore, the information processing device according to the present embodiment may further control association of the application region and the user for each application as the process of the information processing method according to the present embodiment (an association control process).

When "the acquisition process and the behavior control process" or "the association control process, the acquisition process, and the behavior control process" are performed as the process of the information processing method according to the present embodiment, each user who performs an operation in a display region can operate an application that corresponds to an application region that is associated with the user through his or her operation. Thus, operations in operation environments corresponding to respective users are realized through the process of the information processing method according to the present embodiment.

To exemplify a specific example, when "the acquisition process and the behavior control process," or "the association control process, the acquisition process, and the behavior control process" are performed as the process of the information processing method according to the present embodiment, the following control can be realized. Note that it is a matter of course that an implementation in which the process of the information processing method according to the present embodiment is used is not limited to the examples below.

A user can close application regions such as windows associated with him or her together through his or her operation, A user can cause an application region such as a window associated with him or her, which has not been displayed in a display region, to be displayed in a display region through his or her operation.

A user who is associated with an application region can change a GUI (for example, causing the GUI of a user who is accustomed to its operation to be displayed small, causing the GUI of a user who is distant from a display region to be displayed large, or the like).

Thus, by performing the process of the information processing method according to the present embodiment, user convenience can be improved.

Note that the association control process and the behavior control process are processes obtained by dividing the process of the information processing method according to the present embodiment for the sake of convenience. Thus, with regard to the process of the information processing method according to the present embodiment, for example, "the acquisition process and the behavior control process" or "the association control process, the acquisition process, and the behavior control process" can be understood as one process. In addition, with regard to the process of the information processing method according to the present embodiment, for example, "the acquisition process and the behavior control process" or "the association control process, the acquisition process, and the behavior control process" can also be understood as two or more processes (according to any dividing method). Furthermore, the information processing device according to the present embodiment can also perform one or two or more processes among, for example, the "process of detecting an operation of a user or the like," the "determination process according to a user operation," the "process of estimating a distance from a display region to a user whose operation has been detected," a "process of specifying a user who has activated an application" to be described below, a "process of determining whether the user whose operation has been detected is the user indicated by user information" to be described below, and a "process of determining detection of a user who is associated with an application region" to be described below, as a part of the process of the information processing method according to the present embodiment.

Hereinbelow, a case in which the information processing device according to the present embodiment performs the association control process, the acquisition process, and the behavior control process as the process of the information processing method according to the present embodiment will be mainly exemplified. Note that the association control process may be performed by, for example, an external apparatus as described above.

An example of the process of the information processing method according to the present embodiment will be described in more detail.

[2] Example of Process of Information Processing Method According to Present Embodiment (1) Association Control Process The information processing device according to the present embodiment controls association of application regions and users for the respective application regions.

(1-1) First Example of Association Control Process (Example of Association Process)

When an application is newly activated, the information processing device according to the present embodiment associates a user who has newly activated the application and an application region that corresponds to the newly activated application.

The information processing device according to the present embodiment specifies the user who has newly activated the application using any data that can be used to specify the user, for example, an image captured by an imaging device, which captures an image in the direction in which the user who is viewing a display region is imaged. Note that a process of specifying the user who has newly activated the application according to the present embodiment is not limited to the processes disclosed above, and the information processing device according to the present embodiment can specify the user who has newly activated the application through any process that can specify the user who has newly activated the application.

In addition, the process of specifying the user who has newly activated the application according to the present embodiment may be performed by an external apparatus of the information processing device according to the present embodiment. When the process of specifying the user who has newly activated the application is performed by the external apparatus, the information processing device according to the present embodiment, for example, associates the user indicated by user information acquired from the external apparatus and the application region that corresponds to the newly activated application.

In addition, the information processing device according to the present embodiment associates user information that corresponds to the specified user with information indicating the application region that corresponds to the newly activated application, and records the result in a table (an example of association information), or the like. Here, such recording in the table or the like corresponds to an example of, for example, generation of association information.

Furthermore, the information processing device according to the present embodiment causes the application region that corresponds to the newly activated application associated with the user to be displayed in a display region.

Here, the information processing device according to the present embodiment causes the application region that corresponds to the newly activated application to be displayed in, for example, any display range.

Note that a display range in which the information processing device according to the present embodiment causes the application region that corresponds to the newly activated application to be displayed is not limited to the above example.

In the presence of an application region that is associated with the user who has newly activated an application but corresponds to another application, for example, the information processing device according to the present embodiment causes an application region that corresponds to the newly activated application to be displayed in a display region based on the display range of the aforementioned application region that corresponds to the other application.

FIG. 1 is an illustrative diagram for describing an example of the process of the information processing method according to the present embodiment, showing an example of a display range in which the information processing device according to the present embodiment causes an application region that corresponds to a newly activated application to be displayed. FIG. 1 illustrates an example in which two users, a user a and a user b, perform operations in a display region. a1 and a2 in FIG. 1 indicate examples of application regions associated with the user a, and b1 in FIG. 1 indicates an example of an application region associated with the user b.

A of FIG. 1 illustrates an example of a state of a display region R before the application region that corresponds to the newly activated application is displayed. In addition, B of FIG. 1 illustrates an example of a state of the display region R after the application region a2 that corresponds to the application newly activated by the user a is displayed.

When the user a newly activates the application, the information processing device according to the present embodiment causes the application region a2 that corresponds to the newly activated application to be displayed with reference to the display range of the application region a1 that has already been displayed in the display region R, as illustrated in A and B of FIG. 1.

The information processing device according to the present embodiment causes the application region a2 to be displayed in any region in the display region R which is, for example, a region within a predetermined distance from the display range of the application region a1 in which the application region a2 does not overlap another application region. In addition, in the absence of a region that does not overlap another application region, for example, the information processing device according to the present embodiment may cause a part of the application region a2 to be displayed overlapping with another application region. When a plurality of application regions are displayed overlapping each other, the information processing device according to the present embodiment causes the application regions to be displayed first based on a set display rule, such as causing the application regions appearing earlier to be displayed with priority in order, causing the application regions appearing later to be displayed with priority in order, or the like. Further, when a plurality of application regions are displayed overlapping each other, the information processing device according to the present embodiment can also cause the application regions to be displayed first based on priorities set for applications or the application regions.

Note that a process of displaying an application region that corresponds to a newly activated application based on a display range of an application region that corresponds to another application is not limited to the above example. The information processing device according to the present embodiment may divide a display region into a plurality of regions to set divided regions, associate the divided regions with users, or cause an application region that corresponds to a newly activated application to be displayed in a divided region that corresponds to the user who has activated the application.

(1-2) Second Example of Association Control Process (Example of Association Process)

When a predetermined operation of a user in an application region displayed in a display region is detected, the information processing device according to the present embodiment associates the user whose operation has been detected with the application region.

As the predetermined operation of a user in an application region, for example, a direct operation is exemplified. When the predetermined operation of the user in the application region is a direct operation, the application region associated with the user in the association control process according to a second example corresponds to a specific application region among application regions displayed in a display region.

As described above, the process of detecting a user operation or the like may be performed by, for example, the information processing device according to the present embodiment or an external apparatus of the information processing device according to the present embodiment.

Here, a position at which a user points with his or her hand or an operation device can deviate from a position that the user wants to indicate. Thus, a device that performs a process of detecting a user operation or the like in the present embodiment may perform a process of correcting the deviation of the position pointed at (a calibration process). A correction value for correcting the deviation of the position pointed at can be obtained by, for example, learning the difference between a position of a specific object to be operated such as a log-in button and the position at which the user points for the object to be operated. Furthermore, when the deviation between the position pointed at and the intended position has been detected through a user notification operation or the like, a correction value for correcting the deviation of the position pointed at can also be obtained by, for example, learning the difference between the position pointed at and the intended position. As the intended position used for learning, for example, a position designated through a user operation or the like is exemplified.

(1-3) Third Example of Association Control Process (Example of Association Process)

The information processing device according to the present embodiment restricts association of users and application regions based on restriction information indicating restriction on users who can perform operations set for an application. The restriction information according to the present embodiment may be, for example, fixed restriction of which details are set in advance for an application, or variable restriction of which details are changeable based on a user operation or the like.

Here, as an example of an application of which association of its application region and users is restricted, for example, an application having a limit on the number of users who can operate the application, such as a game, is exemplified. Note that an application of which association of its application region and users is restricted is not limited to the above example. Association of application regions and users may be restricted for, for example, any application.

In addition, when no restriction information is set for an application, or when restriction information does not restrict users, the information processing device according to the present embodiment does not restrict association of users and application regions.

Here, as an example of an application of which association of its application region and users is not restricted, for example, any application such as a browser or an application that reproduces content like videos is exemplified. Note that it is a matter of course that association of a user and an application region may be restricted for such a browser or application that reproduces content.

As restriction information according to the present embodiment, for example, information (data) indicating an upper limit of the number of users that can be associated with application regions is exemplified.

When the restriction information according to the present embodiment is information indicating an upper limit of the number of users, the information processing device according to the present embodiment, for example, specifies the number of users associated with an application region that corresponds to the restriction information with reference to a table in which information indicating the application region is associated with user information, or the like. In addition, when the number of users associated with the application region is greater than the upper limit or is equal to or greater than the upper limit, the information processing device according to the present embodiment does not associate the application region with new users. Furthermore, when the number of users associated with the application region is equal to or smaller than the upper limit or is smaller than the upper limit, the information processing device according to the present embodiment associates the application region with new users.

Note that restriction information according to the present embodiment is not limited to the information indicating an upper limit of the number of users.

Restriction information according to the present embodiment may be, for example, user information indicating a specific user who can be associated with an application region. As user information serving as restriction information according to the present embodiment, for example, any data with which a user can be specified, such as an ID indicating the user, is exemplified. In addition, the user information serving as restriction information according to the present embodiment may include information that can be used in specifying a user, for example, data of feature points of his or her face, or the like.

As a specific example of user information serving as restriction information according to the present embodiment, user information indicating a user who has activated an application that corresponds to an application region is exemplified. Note that an example of user information serving as restriction information according to the present embodiment is not limited to the above examples. User information serving as restriction information according to the present embodiment may be, for example, user information indicating a user who performs a predetermined operation not to restrict association of the user with an application region.

When restriction information according to the present embodiment is user information and a user whose operation has been detected is not the user indicated by the user information, the information processing device according to the present embodiment does not associate the user who has performed the detected operation with the application region that corresponds to the user information. In addition, when the user whose operation has been detected is the user indicated by the user information in the above-described case, the information processing device according to the present embodiment associates the user who has performed the detected operation with the application region that corresponds to the user information.

Here, as a process of determining whether the user whose operation has been detected is the user indicated by the user information, for example, a process of matching the user information serving as the restriction information with user information corresponding to the user whose operation has been detected is exemplified. The process of determining whether the user whose operation has been detected is the user indicated by the user information may be performed by the information processing device according to the present embodiment or an external apparatus of the information processing device according to the present embodiment.

The following results, for example, can be realized when the association control process of the third example is performed.

Users and application regions are associated with each other only one-to-one.

A specific application is associated only with the user who has activated the application.

A user to be associated is restricted depending on applications.

A user to be associated is not restricted depending on applications.

(1-4) Fourth Example of Association Control Process (Example of Association Process)

The information processing device according to the present embodiment manages association of application regions and users at a plurality of association levels.

Here, an association level according to the present embodiment refers to an index indicating an intensity of association of an application region and a user. The information processing device according to the present embodiment sets different association levels for, for example, a user who has activated an application and a user who performs an operation in an application region that corresponds to an application that has been activated by another user.

The information processing device according to the present embodiment manages association of application regions and users at a plurality of association levels using, for example, a table (or a database) in which information indicating the application regions, the user information, and the association levels are associated with each other.

In addition, when the association of the application regions and the users are managed at the plurality of association levels, the information processing device according to the present embodiment controls behaviors of an application that corresponds to an application region in the behavior control process according to the present embodiment based on the association levels that are further associated with the application regions. In the behavior control process according to the present embodiment, the information processing device according to the present embodiment specifies an association level with reference to the "table in which the information indicating the application regions, the user information, and the association levels are associated with each other," and controls behaviors of the application that corresponds to the application region based on the specified association level.

By setting association levels according to the present embodiment and controlling behaviors of applications that correspond to application regions based on the association levels, even when the same application is used by a plurality of users, different functions can be provided to the respective users associated with the application regions.

The following results can be realized in a case in which, for example, a higher level (a higher intensity) is set for a user who has activated an application than for a user who performs an operation in an application region that corresponds to an application that has been activated by another user.

A function that can be used only by the user who has activated the application is provided.

Restriction is established for the application; only the user who has activated the application can terminate the application, only the user who has activated the application can store data such as an image, etc.

(1-5) Fifth Example of Association Control Process (Example of Association Process)

The information processing device according to the present embodiment may associate users and application regions using a process created by combining two or more of the association control process of the first example introduced in (1-1) to the association control process of the fourth example introduced in (1-4) above.

Note that an association control process according to the present embodiment is not limited to the processes of associating users and application regions, such as the association control process of the first example introduced in (1-1) to the association control process of the fifth example introduced in (1-5) above.

The information processing device according to the present embodiment can also perform a process of cancelling association of a user and an application region associated with the user as an association control process according to the present embodiment, for example, as will be introduced in (1-6) to (1-8) below.

The information processing device according to the present embodiment cancels association of a user and an application region associated with the user by, for example, updating a table in which information indicating the application region is associated with user information, or the like. The information processing device according to the present embodiment cancels the association of the user and the application region associated with the user by, for example, deleting a record of the association of the user and the application region to be cancelled, or setting a flag of the record indicating that the association is invalid to be on. Note that it is a matter of course that a process of cancelling association of a user and an application region associated with the user is not limited to the above example.

(1-6) Sixth Example of Association Control Process (Example of Cancellation Process)

When a predetermined user operation of a user associated with an application region is detected, the information processing device according to the present embodiment cancels the association of the user and the application region associated therewith.

As the predetermined user operation to cancel association, for example, there are the following examples. Note that a predetermined user operation to cancel association is not limited to the following examples, and may be any operation such as an operation using a gesture.

An operation of selecting an OFF button (an example of a display object for cancelling association) displayed in a display region An operation of selecting cancellation of association from a menu screen displayed in a display region An operation of selecting a display part indicating the number of associated users displayed in an application region (an example of an operation when there is a limit on the number of users associated with the application region)

As described above, a process of detecting the user operation or the like may be performed by, for example, the information processing device according to the present embodiment or an external apparatus of the information processing device according to the present embodiment.

(1-7) Seventh Example of Association Control Process (Example of Cancellation Process)

When a user associated with an application region is not detected, the information processing device according to the present embodiment cancels association of the user and an application region associated therewith.

The information processing device according to the present embodiment determines whether the user associated with the application region is detected using, for example, any data that can be used to specify the user, such as an image captured by an imaging device, which captures an image in a direction in which the user who is viewing a display region is imaged. Note that a process of determining detection of the user associated with the application region according to the present embodiment is not limited to the above-described process, and the information processing device according to the present embodiment can determine whether the user associated with the application region is detected through the result of any process in which the user associated with the application region can be specified.

In addition, when it is not determined that the user associated with the application region is detected, the information processing device according to the present embodiment cancels the association of the user and the application region.

Note that a state in which the user associated with the application region is not determined to be detected continues longer than a set period or the state in which the user associated with the application region is not determined to be detected continues for the set period or longer, the information processing device according to the present embodiment may cancel the association of the user and the application region. By cancelling the association of the user and the application region based on the set period as described above, cancellation of the association with the application region that the user does not intend, which results from erroneous determination, for example, can be prevented.

In addition, the process of determining detection of the user associated with the application region according to the present embodiment may be performed by an external apparatus of the information processing device according to the present embodiment. When the external apparatus performs the process of determining detection of the user associated with the application region and information (data) indicating the result of the determination acquired from the external apparatus represents that the user associated with the application region is not detected, for example, the information processing device according to the present embodiment cancels the association of the user with the application region.

(1-8) Eighth Example of Association Control Process

The information processing device according to the present embodiment may cancel association of a user and an application region associated therewith through the association control process of the sixth example introduced in (1-6) and the association control process of the seventh example introduced in (1-7) above.

(1-9) Ninth Example of Association Control Process

Note that an association control process according to the present embodiment is not limited to the process of associating a user and an application region, or the process of cancelling association of a user and an application region.

The information processing device according to the present embodiment, for example, can also visually identify a user associated with an application region as described in the following examples. Note that it is a matter of course that an example of a GUI that identifies a user associated with an application region is not limited to the following examples, A color of a part (for example, a bar, a button, etc.) of an application region such as a window changes according to respective users. As a color of the window for each user, for example, a color of a cursor of the user is exemplified.

An object corresponding to a user, such as an icon corresponding to the user or a face image of the user, is displayed in a part of an application region.

A character (or a string of characters) indicating a user, such as the name or ID of the user, is displayed in a part of an application region. To exemplify a specific example, "a" indicating the user a is displayed in the application regions a1 and a2 corresponding to the user a, and "b" indicating the user b is displayed in the application region b1 corresponding to the user b as illustrated in FIG. 1.

The number of users associated with an application region is displayed in a part of the application region.

Combination of two or more of the above-described examples.

(1-10) Tenth Example of Association Control Process

The information processing device according to the present embodiment can also perform a process of combining two or more of the association control process of the first example introduced in (1-1) to the association control process of the ninth example introduced in (1-9) above.

The information processing device according to the present embodiment controls, for example, association of application regions and users by performing the association control process of the first example introduced in (1-1) to the association control process of the tenth example introduced in (1-10) above.

(2) Acquisition Process

The information processing device according to the present embodiment acquires association information.

When the information processing device according to the present embodiment performs the process (1) (the association control process), the information processing device according to the present embodiment acquires, for example, association information generated through the process (1) (the association control process). The information processing device according to the present embodiment acquires the association information by, for example, reading the association information stored in a recording medium such as a storage unit (to be described below), or the like.

In addition, regardless of whether the information processing device according to the present embodiment performs the process (1) (the association control process), when an external apparatus performs the process (1) (the association control process), the information processing device according to the present embodiment may acquire association information generated by the external apparatus. The information processing device according to the present embodiment acquires the association information generated by the external apparatus via, for example, communication with the external apparatus. Note that another device such as a relay device may intermediate the communication with the external apparatus to acquire the association information.

(3) Behavior Control Process

When a user operation in a display region is detected, the information processing device according to the present embodiment controls behaviors of an application that corresponds to an application region based on association information with regard to the application region and information indicating a user whose operation has been detected (user information).

Here, the information processing device according to the present embodiment, for example, controls behaviors of the application based on presence of the application region associated with the user whose operation has been detected, and thus controls behaviors of the application according to the user whose operation has been detected. More specifically, in the presence of the application region associated with the user whose operation has been detected, for example, the information processing device according to the present embodiment controls behaviors of the application that corresponds to the application region associated with the user based on the detected user operation in the display region. In addition, in the absence of the application region associated with the user whose operation has been detected, for example, the information processing device according to the present embodiment does not control behaviors of an application that corresponds to an application region based on a detected user operation in a display region.

Furthermore, when behaviors of an application that corresponds to an application region are controlled, for example, the information processing device according to the present embodiment controls behaviors of the application that corresponds to the application region by performing the process (A) or the process (B) based on, for example, a determination result of a determination process according to a user operation (a process of determining whether a detected user operation in a display region is an operation for the specific application region displayed in the display region). Here, the determination process according to a user operation may be performed by the information processing device according to the present embodiment, or an external apparatus of the information processing device according to the present embodiment.

The information processing device according to the present embodiment controls behaviors of the application by performing, for example, the process of the first control example introduced in (a) to the process of the fourth control example introduced in (d).

In addition, when association of application regions and users is managed at a plurality of association levels in the association control process of the fourth example introduced in (1-4) (or a process including the association control process of the fourth example), the information processing device according to the present embodiment may control behaviors of the application that corresponds to an application region based on an association level that is further associated with the application region, for example, as described above.

As the process of the information processing method according to the present embodiment, for example, the information processing device according to the present embodiment performs the process (1) (the association control process), the process (2) (the acquisition process), and the process (3) (the behavior control process).

Note that the process (1) (the association control process), the process (2) (the acquisition process), and the process (3) (the behavior control process) are processes obtained by dividing the process of the information processing method according to the present embodiment for the sake of convenience, and the process of the information processing method according to the present embodiment is not limited to the process (1) (the association control process), the process (2) (the acquisition process), and the process (3) (the behavior control process). In addition, the process (1) (the association control process) may be performed by an external apparatus as described above, and the information processing device according to the present embodiment may not perform the process (1) (the association control process). Furthermore, as the process of the information processing method according to the present embodiment, the information processing device according to the present embodiment may further perform, for example, another process such as a process of detecting a user operation or the like.

(Information Processing Device According to Present Embodiment)

Next, an example of a configuration of the information processing device according to the present embodiment which can perform the above-described process of the information processing method according to the present embodiment will be described.

Figure 2:
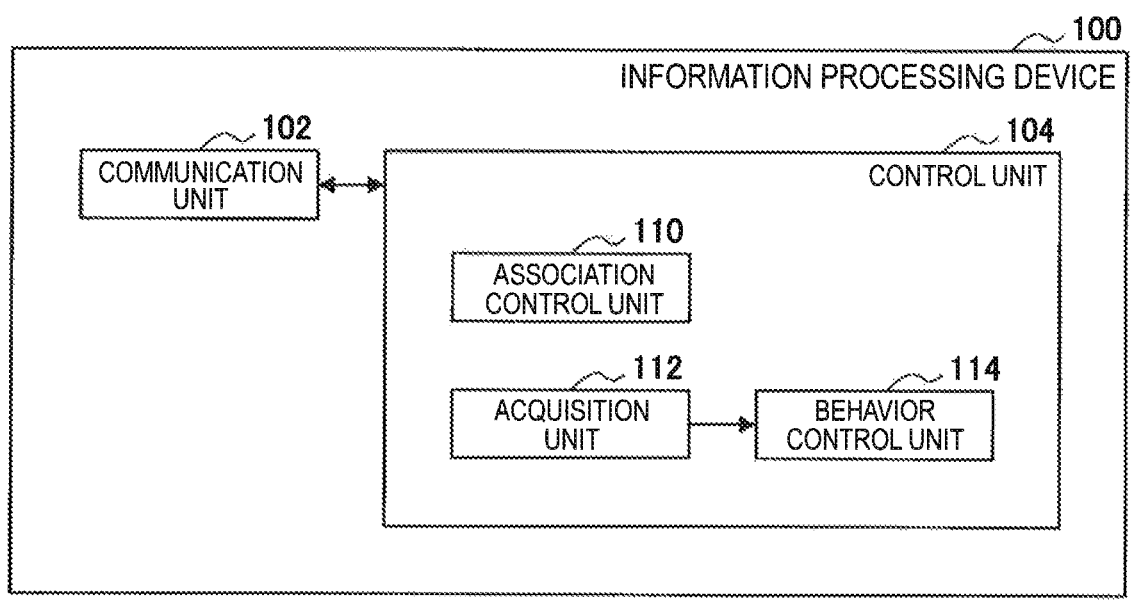
FIG. 2 is a block diagram showing an example of a configuration of an information processing device according to the present embodiment.

FIG. 2 is a block diagram showing the example of the configuration of the information processing device 100 according to the present embodiment. The information processing device 100 has, for example, a communication unit 102 and a control unit 104.

In addition, the information processing device 100 may have, for example, a Read Only Memory (ROM; not illustrated), a Random Access Memory (RAM; not illustrated), a storage unit (not illustrated), an operation unit which can be operated by a user (not illustrated), a display unit which displays various screens on a display screen (not illustrated), and the like. The information processing device 100 connects the respective constituent members with each other using, for example, a bus serving as a data transmission path.

The ROM (not illustrated) stores control data such as programs and arithmetic parameters used by the control unit 104. The RAM (not illustrated) temporarily stores programs executed by the control unit 104, and the like.

The storage unit (not illustrated) is a storage means that the information processing device 100 has, and stores, for example, data related to the information processing method according to the present embodiment such as a table (or a database) in which information indicating application regions and user information are associated, and various kinds of data such as applications. Here, as the storage unit (not illustrated), for example, a magnetic recording medium such as a hard disk, a non-volatile memory such as a flash memory, or the like is exemplified. Furthermore, the storage unit (not illustrated) may be detachable from the information processing device 100.

As the operation unit (not illustrated), an operation input device to be described below is exemplified. In addition, as the display unit (not illustrated), a display device to be described below is exemplified.

[Example of Hardware Configuration of Information Processing Device 100]

Figure 3:
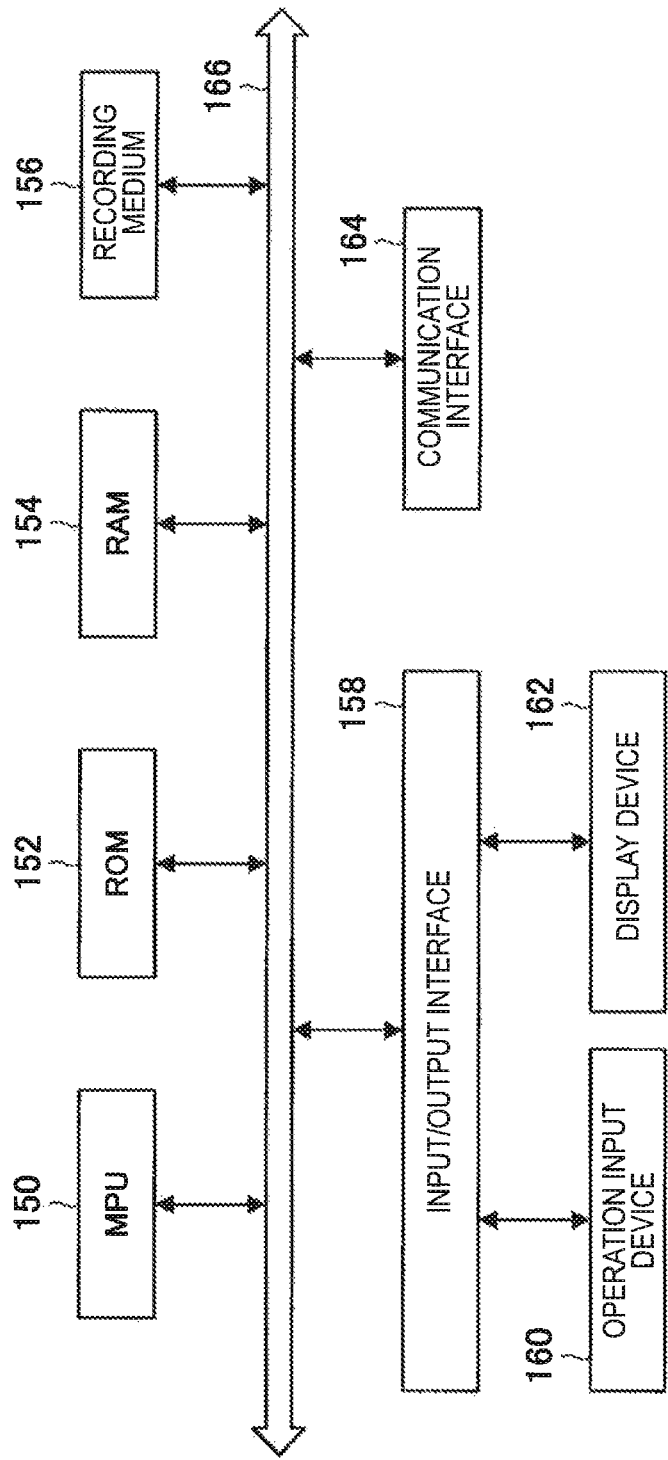
FIG. 3 is an illustrative diagram showing an example of a hardware configuration of the information processing device according to the present embodiment.

FIG. 3 is an illustrative diagram showing an example of a hardware configuration of the information processing device 100 according to the present embodiment. The information processing device 100 has, for example, an MPU 150, a ROM 152, a RAM 154, a recording medium 156, an input/output interface 158, an operation input device 160, a display device 162, and a communication interface 164. In addition, the information processing device 100 connects the respective constituent elements with each other using, for example, a bus 166 serving as a data transmission path.

The MPU 150 is constituted by, for example, one or two or more processors configured as arithmetic circuits such as micro processing units (MPUs), various processing circuits, and the like, and functions as the control unit 104 which controls the information processing device 100 overall. In addition, the MPU 150 serves as, for example, an association control unit 110, an acquisition unit 112, and a behavior control unit 114 to be described below in the information processing device 100.

The ROM 152 stores control data such as programs and arithmetic parameters used by the MPU 150. The RAM 154 temporarily stores, for example, programs executed by the MPU 150, and the like.

The recording medium 156 functions as a storage unit (not illustrated), and stores data related to the information processing method according to the present embodiment, for example, a table (or a database) in which information indicating application regions and user information are associated, and various kinds of data such as applications. Here, as the recording medium 156, for example, a magnetic recording medium such as a hard disk, or a non-volatile memory such as a flash memory is exemplified. In addition, the recording medium 156 may be detachable from the information processing device 100.

The input/output interface 158 connects, for example, the operation input device 160 and the display device 162. The operation input device 160 functions as an operation unit (not illustrated), and the display device 162 functions as a display unit (not illustrated). Here, as the input/output interface 158, for example, a Universal Serial Bus (USB) terminal, a Digital Visual interface (DVI) terminal, a High-Definition Multimedia Interface (HDMI) (registered trademark) terminal, any of various processing circuits, or the like is exemplified.

Furthermore, the operation input device 160 is provided, for example, on the information processing device 100, and is connected to the input/output interface 158 inside the information processing device 100. As the operation input device 160, for example, a button, an arrow key, a rotation-type selector such as a jog dial, a combination thereof, or the like is exemplified.

In addition, the display device 162 is provided, for example, on the information processing device 100, and is connected to the input/output interface 158 inside the information processing device 100. The display device 162 is constituted by one or two or more display devices, and forms a display region according to the present embodiment with display screens of the respective display devices. Examples of the display devices constituting the display device 162 include liquid crystal displays and organic electro-luminescence displays (organic EL displays, or they are also called organic light emitting diode (OLED) displays) or the like are exemplified.

Note that it is a matter of course that the input/output interface 158 can also be connected to an external device such as an external operation input device (for example, a keyboard, a mouse, or the like) serving as an external apparatus of the information processing device 100, or an external display device. Furthermore, the display device 162 may be a device on which display and user operations are possible, for example, a touch panel.

The communication interface 164 is a communication means provided in the information processing device 100, and functions as the communication unit 102 to perform wireless or wired communication with an external device such as an external imaging device or an external display device, an external operation device such as a remote controller, or an external apparatus via a network (or in a direct manner). Here, as the communication interface 164, for example, a communication antenna and radio frequency (RF) circuit (for wireless communication), an IEEE 802.15.1 port and transmission/reception circuit (for wireless communication), an IEEE 802.11 port and transmission/reception circuit (for wireless communication), a local area network (LAN) terminal and transmission/reception circuit (for wired communication), or the like is exemplified. Furthermore, as a network according to the present embodiment, for example, a wired network such as a LAN or a wide area network (WAN), a wireless network such as a wireless local area network (WEAN), or the Internet that uses communication protocols such as Transmission Control Protocol/Internet Protocol (TCP/IP), or the like is exemplified.

The information processing device 100 performs the process of the information processing method according to the present embodiment with, for example, the configuration illustrated in FIG. 3. Note that the hardware configuration of the information processing device 100 according to the present embodiment is not limited to the configuration illustrated in FIG. 3.

When, for example, the information processing device 100 communicates with an external apparatus via a connected external communication device or performs processing in a stand-alone manner, the communication interface 164 may not be provided.

In addition, the information processing device 100 may include, for example, a plurality of communication interfaces compatible with the same or different communication schemes.

Furthermore, the information processing device 100 may further include, for example, an imaging device serving as an imaging unit (not illustrated) which generates captured images through imaging. When the imaging device is provided, the information processing device 100 can perform processing of, for example, specifying a user using an image captured by the imaging device.

Moreover, the information processing device 100 can have a configuration in which, for example, the recording medium 156, the operation input device 160, or the display device 162 is not provided.

In addition, the configuration illustrated in FIG. 3 (or a configuration of a modified example thereof) may be realized with, for example, one or two or more integrated circuits (ICs).

The example of the configuration of the information processing device 100 will be described with reference to FIG. 2 again. The communication unit 102 is a communication means included in the information processing device 100, and performs wireless or wired communication with an external device such as an external imaging device or an external display device, or an external apparatus via a network (or in a direct manner). In addition, communication of the communication unit 102 is controlled by, for example, the control unit 104.

Here, although, for example, a communication antenna and RF circuit, a LAN terminal and transmission/reception circuit, or the like is exemplified as the communication unit 102, a configuration of the communication unit 102 is not limited thereto. The communication unit 102 can employ, for example, a configuration based on any standard in which communication can be performed using a USB terminal and transmission/reception circuit, an infrared communication port and transmission/reception circuit, or any configuration in which communication can be performed with an external apparatus via a network. In addition, the communication unit 102 may have a configuration in which it can communicate with one or two or more external apparatuses using a plurality of communication schemes.

The control unit 104 is configured as, for example, an MPU, and serves to control the information processing device 100 overall. Furthermore, the control unit 104 includes, for example, the association control unit 110, the acquisition unit 112, and the behavior control unit 114, and plays a leading role in performing the process of the information processing method according to the present embodiment.

The association control unit 110 plays a leading role in performing the process (association control process) of (1) described above, and controls association of application regions and users for each application region. The association control unit 110 performs, for example, the association control process of the first example introduced in (1-1) above to the association control process of the tenth example introduced in (1-10) above.

The acquisition unit 112 plays a leading role in performing the process (the acquisition process) of (2) described above to acquire association information. The acquisition unit 112, for example, reads association information from a recording medium such as a storage unit (not illustrated), or acquires association information through communication of the communication unit 102 with an external apparatus.

The behavior control unit 114 plays a leading role in performing the process (the behavior control process) of (3) described above to control, when a user operation in a display region is detected, behaviors of an application that corresponds to an application region according to the user whose operation has been detected based on information indicating the user associated with the application region.

Here, in the presence of the application region associated with the user whose operation has been detected, for example, the behavior control unit 114 controls behaviors of the application that corresponds to the application region associated with the user based on the detected user operation performed in the display region. Furthermore, in the absence of the application region associated with the user whose operation has been detected, for example, the behavior control unit 114 does not control behavior of the application that corresponds to the application region based on the detected user operation performed in the display region.

Furthermore, the behavior control unit 114 controls behaviors of the application that corresponds to the application region by, for example, performing the process introduced in (A) above or the process introduced in (B) above based on, for example, a determination result of a determination process according to a user operation (a process of determining whether the detected user operation performed in the display region is an operation in a specific application region displayed in the display region).

In addition, the behavior control unit 114 controls behaviors of the application by performing, for example, the process of the first control example introduced in (a) to the process of the fourth control example introduced in (d) above.

Furthermore, when the association control unit 110 manages association of application regions and users at a plurality of association levels, the behavior control unit 114 may control behaviors of an application that corresponds to an application region based on an association level that is further associated with the application region.

By including the association control unit 110, the acquisition unit 112, and the behavior control unit 114, for example, the control unit 104 performs a leading role in performing the process of the information processing method according to the present embodiment.

With the configuration illustrated in FIG. 2, for example, the information processing device 100 performs the process of the information processing method according to the present embodiment (for example, the process (1) (the association control process), the process (2) (the acquisition process), and the process (3) (the behavior control process)).

Thus, the information processing device 100 can help user convenience to improve with, for example, the configuration illustrated in FIG. 2 when a display region can be simultaneously used by a plurality of users.

In addition, with the configuration illustrated in FIG. 2, for example, the information processing device 100 can exhibit effects obtained by, for example, performing the process of the information processing method according to the present embodiment as described above.

Note that a configuration of the information processing device according to the present embodiment is not limited to the configuration illustrated in FIG. 2.

For example, the information processing device according to the present embodiment can include one or two or more of the association control unit 110, the acquisition unit 112, and the behavior control unit 114 illustrated in FIG. 2, separately from the control unit 104 (which may be realized with, for example, a different processing circuit).

In addition, the association control process and the behavior control process are assumed to be processes obtained by dividing the process of the information processing method according to the present embodiment for the sake of convenience as described above. Thus, a configuration for realizing the process of the information processing method according to the present embodiment is not limited to the association control unit 110, the acquisition unit 112, and the behavior control unit 114 illustrated in FIG. 2, and can employ a configuration depending on a dividing method of the process of the information processing method according to the present embodiment.

Furthermore, when an external apparatus performs the process (1) (the association control process), for example, the information processing device according to the present embodiment can also employ a configuration in which the association control unit 110 is not provided. Even with the configuration in which the association control unit 110 is not provided, the information processing device according to the present embodiment can exhibit the same effects as the effects to be exhibited by the information processing device 100 illustrated in FIG. 2 as, for example, the acquisition unit 112 performs the process (2) (the acquisition process) to acquire association information generated by the external apparatus.

In addition, when communication is performed with an external apparatus via an external communication device having the same function and configuration as the communication unit 102, or processing is performed in a stand-alone manner, for example, the information processing device according to the present embodiment may not include the communication unit 102.

Furthermore, the information processing device according to the present embodiment may further include, for example, an imaging unit (not illustrated) that is configured as an imaging device and generates captured images through imaging.

Although the present embodiment has been described above exemplifying the information processing device, the present embodiment is not limited thereto. The present embodiment can be applied to various kinds of equipment, for example, computers such as personal computers (PCs) and servers, display devices, television receiver sets, signage terminals, and the like. Furthermore, the present embodiment can also be applied to, for example, processing ICs which can be incorporated into the above-described equipment.

In addition, the information processing device according to the present embodiment can also be applied to a system constituted by one or two or more devices based on the premise of connection to a network (or inter-device communication), for example, cloud computing, or the like. In other words, the above-described information processing device according to the present embodiment can also be realized as, for example, an information processing system constituted by a plurality of devices.

When the above-described information processing device according to the present embodiment is realized as a system of cloud computing, etc., for example, the system according to the present embodiment performs, for example, the process of the information processing method according to the present embodiment to control behaviors of an application that corresponds to an application region according to a user who has performed an operation in a display region of a display device that can perform wired or wireless communication.

(Program According to Present Embodiment)

As a program for causing a computer to function as the information processing device according to the present embodiment (a program that can execute the process of the information processing method according to the present embodiment, for example, "the process (2) (the acquisition process) and the process (3) (the behavior control process)," "the process (1) (the association control process) to the process (3) (the behavior control process)," or the like) is executed by a processor of the computer, improvement in user convenience when a display region is simultaneously used by a plurality of users can be achieved.

In addition, when the program for causing a computer to function as the information processing device according to the present embodiment is executed by a processor of the computer, the effects exhibited through the above-described process of the information processing method according to the present embodiment can be exhibited.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the program for causing a computer to function as the information processing device according to the present embodiment (a computer program) is assumed to be provided in the above description, for example, a recording medium in which the program is stored can also be provided along therewith in the present embodiment.

The above-described configuration is an example of the present embodiment and of course belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device including:

an acquisition unit configured to acquire association information indicating association of an application region and a user, the application region corresponding to an activated application and being a region displayed in a display region; and a behavior control unit configured to control, when a user operation in the display region is detected, a behavior of the application that corresponds to the application region based on the association information with regard to the application region and information indicating a user whose operation has been detected.

(2)

The information processing device according to (1), wherein, when the detected user operation in the display region is determined to be an operation in the specific application region displayed in the display region, the behavior control unit controls a behavior of the application that corresponds to the specific application region.

(3)

The information processing device according to (1) or (2), wherein, when the detected user operation in the display region is not determined to be an operation in the specific application region displayed in the display region, the behavior control unit controls a behavior of the application that corresponds to the application region in which a user whose operation has been detected performed an operation most recently.

(4)

The information processing device according to (1) or (2), wherein, when the detected user operation in the display region is not determined to be an operation in the specific application region displayed in the display region, the behavior control unit controls a behavior of the application that corresponds to all the application regions associated with a user whose operation has been detected.

(5)

The information processing device according to any one of (1) to (4), wherein, in presence of the application region associated with a user whose operation has been detected, the behavior control unit controls a behavior of the application that corresponds to the application region associated with the user based on the detected user operation in the display region, and in absence of the application region associated with a user whose operation has been detected, the behavior control unit does not control a behavior of the application that corresponds to the application region based on the detected user operation in the display region.

(6)

The information processing device according to any one of (1) to (5), wherein the behavior control unit changes a method of displaying the application region associated with a user whose operation has been detected according to the user.

(7)

The information processing device according to any one of (1) to (6), wherein the behavior control unit changes details of a display of the application region associated with a user whose operation has been detected according to the user.

(8)

The information processing device according to any one of (1) to (7), further including:

an association control unit configured to control association of the application region and the user for each application region.

(9)

The information processing device according to (8), wherein the association control unit controls the association of the user and the application region based on restriction information indicating restriction on a user who can perform an operation which is set for the application.

(10)

The information processing device according to (9), wherein the restriction information is information indicating an upper limit of the number of users who can be associated with the application region, and when the number of users who are associated with the application region is greater than the upper limit or is equal to or greater than the upper limit, the association control unit does not associate the application region with a new user.

(11)

The information processing device according to (9), wherein the restriction information is user information indicating a specific user who can be associated with the application region, and when a user whose operation has been detected is not the user indicated by the user information, the association control unit does not associate the user who has performed the detected operation with the application region corresponding to the user information.

(12)

The information processing device according to (11), wherein the user information is information indicating the user who has activated the application that corresponds to the application region.

(13)

The information processing device according to any one of (8) to (12), wherein, when a predetermined user operation of a user who is associated with the application region is detected, the association control unit cancels the association of the user and the application region that is associated with the user.

(14)

The information processing device according to any one of (8) to (13), wherein, when a user who is associated with the application region is not detected, the association control unit cancels the association of the user and the application region that is associated with the user.

(15)

The information processing device according to any one of (8) to (14), wherein the association control unit manages the association of the application region and the user at a plurality of association levels, and the behavior control unit further controls a behavior of the application that corresponds to the application region based on the association levels associated with the application region.

(16)

The information processing device according to any one of (8) to (15), wherein, when an application is newly activated, the association control unit associates the user who has newly activated the application with the application region that corresponds to the newly activated application.

(17)

The information processing device according to (16), wherein, in presence of the application region which is associated with the user who has newly activated the application and corresponds to another application, the association control unit causes the application region, which corresponds to the newly activated application, to be displayed in the display region based on a display range of the application region that corresponds to the other application in the display region.

(18)

The information processing device according to any one of (8) to (17), wherein, when a predetermined user operation in the application region displayed in the display region is detected, the association control unit associates a user whose operation has been detected with the application region.

(19)

The information processing device according to any one of (8) to (18), in which the association control unit visually identifies the user associated with the application region.

(20)

An information processing method executed by an information processing device, the method including:

a step of controlling association of an application region and a user for each application region, the application region corresponding to an activated application and being a region displayed in a display region; and a step of controlling, when a user operation in the display region is detected, a behavior of the application that corresponds to the application region according to a user whose operation has been detected based on information indicating a user who is associated with the application region.

(21)

A program for causing a computer to execute:

a step of controlling association of an application region and a user for each application region, the application region corresponding to an activated application and being a region displayed in a display region; and a step of controlling, when a user operation in the display region is detected, a behavior of the application that corresponds to the application region according to a user whose operation has been detected based on information indicating a user who is associated with the application region.

REFERENCE SIGNS LIST

100 information processing device
102 communication unit
104 control unit
110 association control unit
112 acquisition unit
114 behavior control unit

The invention claimed is:

1. An information processing device comprising:
an acquisition unit configured to acquire association information indicating association of an application region and a user, the application region corresponding to an application having been activated and being a region currently displayed in a display region; and
a behavior control unit configured to
control, when an operation of the user in the display region is detected, a behavior of the application that corresponds to the application region based on the association information with regard to the application region and information indicating the user whose operation has been detected, and control, based on a determination that the detected operation in the display region is not an operation of the user in any application region currently displayed in the display region, a behavior of an application that corresponds to an application region not currently displayed in the display region, the application region not currently displayed in the display region being initially displayed based on the corresponding application being activated, wherein the behavior control unit is further configured to, control, based on the determination that the detected operation in the display region is not an operation of the user in any application region currently displayed in the display region, a cursor corresponding to the user whose operation has been detected to automatically move to a position of an application region in which the user performed an operation most recently, and wherein the acquisition unit and the behavior control unit are each implemented via at least one processor.

2. The information processing device according to claim 1, wherein the behavior control unit is further configured to control, based on a determination that the detected operation in the display region is an operation in the application region displayed in the display region, a behavior of the application that corresponds to the application region.

3. The information processing device according to claim 1, wherein the behavior control unit is further configured to control, based on the determination that the detected operation in the display region is not the operation in the application region displayed in the display region, a behavior of applications that correspond to all application regions associated with the user whose operation has been detected.

4. The information processing device according to claim 1, wherein, in presence of the application region associated with the user whose operation has been detected, the behavior control unit controls a behavior of the application that corresponds to the application region associated with the user based on the detected operation in the display region, and in absence of the application region associated with the user whose operation has been detected, the behavior control unit does not control a behavior of the application that corresponds to the application region based on the detected operation in the display region.

5. The information processing device according to claim 1, wherein the behavior control unit changes a method of displaying the application region associated with the user whose operation has been detected according to the user.

6. The information processing device according to claim 1, wherein the behavior control unit changes details of a display of the application region associated with the user whose operation has been detected according to the user.

7. The information processing device according to claim 1, further comprising:

an association control unit configured to control association of the application region and the user for each application region, wherein the association control unit is implemented via at least one processor.

8. The information processing device according to claim 7, wherein the association control unit controls the association of the user and the application region based on restriction information indicating restriction on a user who can perform an operation which is set for the application.

9. The information processing device according to claim 8, wherein the restriction information includes information indicating an upper limit of a number of users who can be associated with the application region, and when the number of users who are associated with the application region is equal to or greater than the upper limit, the association control unit does not associate the application region with a new user.

10. The information processing device according to claim 8, wherein the restriction information includes user information indicating a specific user who can be associated with the application region, and when the user whose operation has been detected is not the user indicated by the user information, the association control unit does not associate the user who has performed the detected operation with the application region corresponding to the user information.

11. The information processing device according to claim 10, wherein the user information includes information indicating the user who has activated the application that corresponds to the application region.

12. The information processing device according to claim 7, wherein, when a predetermined user operation of a user who is associated with the application region is detected, the association control unit cancels the association of the user and the application region that is associated with the user.

13. The information processing device according to claim 7, wherein, when a user who is associated with the application region is not detected, the association control unit cancels the association of the user and the application region that is associated with the user.

14. The information processing device according to claim 7, wherein the association control unit manages the association of the application region and the user at a plurality of association levels, and the behavior control unit further controls a behavior of the application that corresponds to the application region based on the association levels associated with the application region.

15. The information processing device according to claim 7, wherein, when an application is activated, the association control unit associates the user who has activated the application with the application region that corresponds to the activated application.

16. The information processing device according to claim 15, wherein, in presence of the application region which is associated with the user who has activated the application and corresponds to another application, the association control unit causes the application region, which corresponds to the activated application, to be displayed in the display region based on a display range of the application region that corresponds to the another application in the display region.

17. The information processing device according to claim 7, wherein, when a predetermined user operation in the application region displayed in the display region is detected, the association control unit associates a user whose operation has been detected with the application region.

18. The information processing device according to claim 1, wherein the behavior control unit is further configured to, cause, based on the determination that the detected operation in the display region is not the operation of the user in any application region currently displayed in the display region, the application that corresponds to an application region in which the user performed an operation most recently to work according to the detected operation.

19. An information processing method executed by an information processing device, the method comprising:
- acquiring association information indicating association of an application region and a user, the application region corresponding to an application having been activated and being a region currently displayed in a display region;
- controlling, when an operation of the user in the display region is detected, a behavior of the application that corresponds to the application region based on the association information with regard to the application region and information indicating the user whose operation has been detected;
- controlling, based on a determination that the detected operation of the user in the display region is not an operation in any application region currently displayed in the display region, a behavior of an application that corresponds to an application region not currently displayed in the display region, the application region not currently displayed in the display region being initially displayed based on the corresponding application being activated; and
- controlling, based on the determination that the detected operation in the display region is not an operation of the user in any application region currently displayed in the display region, a cursor corresponding to the user whose operation has been detected to automatically move to a position of an application region in which the user performed an operation most recently.

20. A non-transitory computer-readable recording medium having embodied thereon a program, which when executed by a computer causes the computer to execute a method, the method comprising:
- acquiring association information indicating association of an application region and a user, the application region corresponding to an application having been activated and being a region currently displayed in a display region;
- controlling, when an operation of the user in the display region is detected, a behavior of the application that corresponds to the application region based on the association information with regard to the application region and information indicating the user whose operation has been detected;
- controlling, based on a determination that the detected operation in the display region is not an operation of the user in any application region currently displayed in the display region, a behavior of an application that corresponds to an application region not currently displayed in the display region, the application region not currently displayed in the display region being initially displayed based on the corresponding application being activated; and
- controlling, based on the determination that the detected operation in the display region is not an operation of the user in any application region currently displayed in the display region, a cursor corresponding to the user whose operation has been detected to automatically move to a position of an application region in which the user performed an operation most recently.

* * * * *